No. 771,778. PATENTED OCT. 4, 1904.
L. P. GRAHAM.
CORN PLANTER.
APPLICATION FILED APR. 4, 1904.
NO MODEL. 3 SHEETS—SHEET 1.

Fig. 4ª

Witnesses
Ina C. Graham.
Fay Graham.

Inventor.
Levi P. Graham.

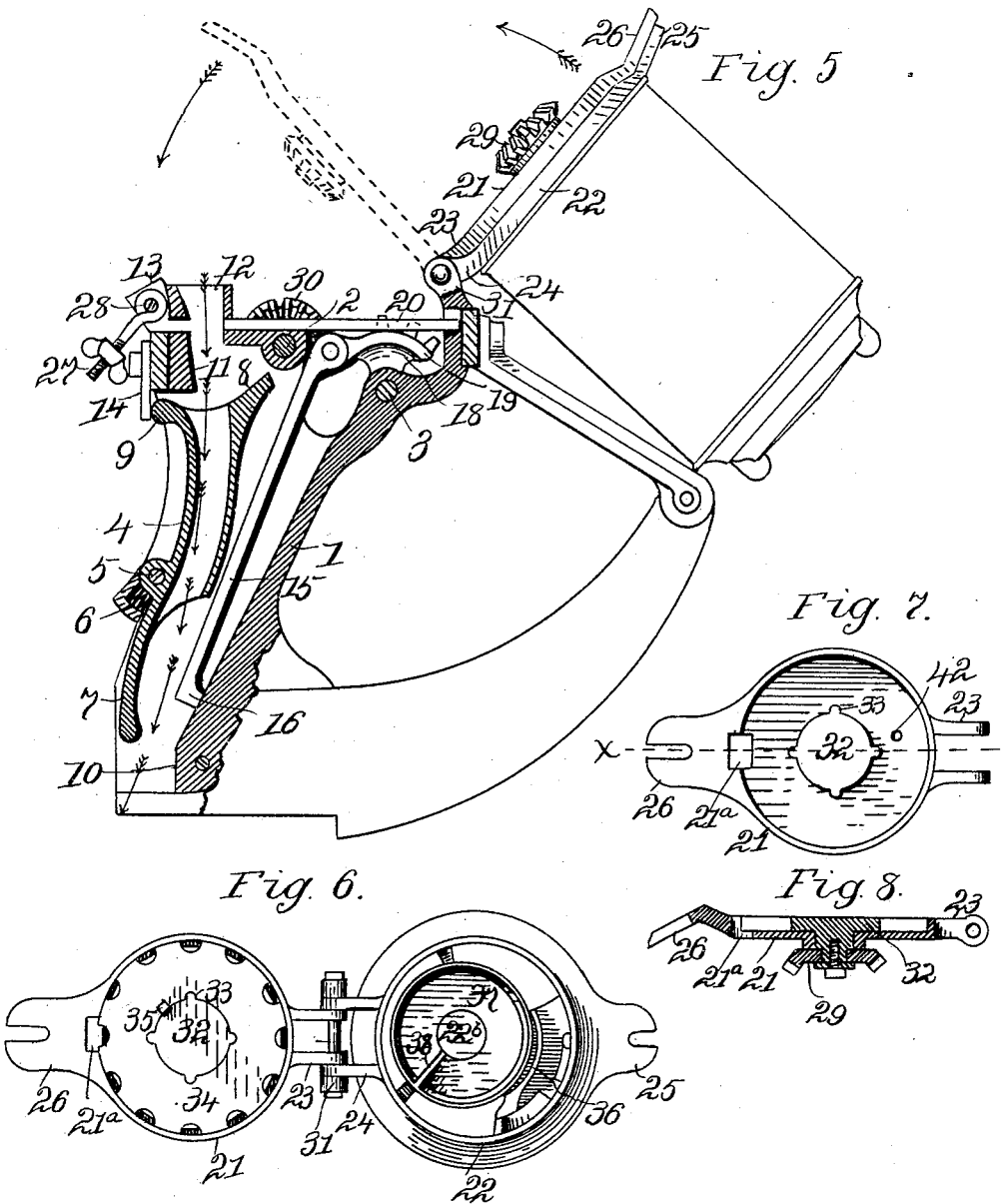

No. 771,778. PATENTED OCT. 4, 1904.
L. P. GRAHAM.
CORN PLANTER.
APPLICATION FILED APR. 4, 1904.
NO MODEL. 3 SHEETS—SHEET 3.

Witnesses.
Ina C Graham
Fay Graham

Inventor,
Levi P. Graham

No. 771,778.

Patented October 4, 1904.

UNITED STATES PATENT OFFICE.

LEVI P. GRAHAM, OF DECATUR, ILLINOIS.

CORN-PLANTER.

SPECIFICATION forming part of Letters Patent No. 771,778, dated October 4, 1904.

Application filed April 4, 1904. Serial No. 201,562. (No model.)

*To all whom it may concern:*

Be it known that I, LEVI P. GRAHAM, of the city of Decatur, county of Macon, and State of Illinois, have invented certain new and useful Improvements in Corn-Planters, of which the following is a specification.

This invention relates to the dropping mechanism of corn-planters.

One object of the invention is to prevent hills from becoming mixed in the shank.

Another object is to facilitate access to the seed-plates, and another object is to provide for dropping the seed by either edgewise or flatwise selection.

The invention is exemplified in the structure hereinafter described, and it is defined in the appended claims.

Figure 1:
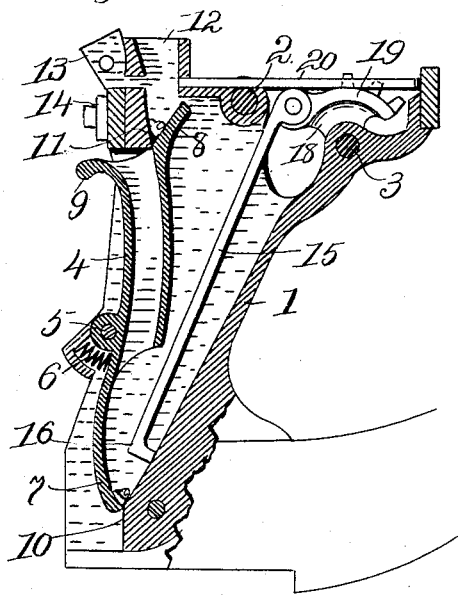
Figure 2:
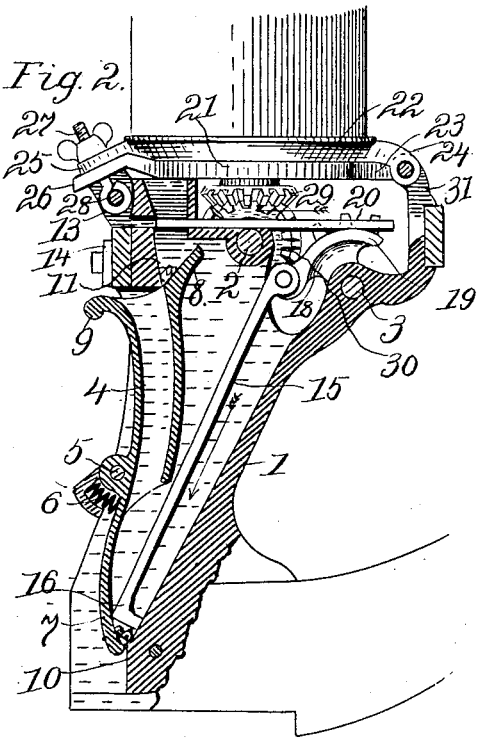
Figure 3:
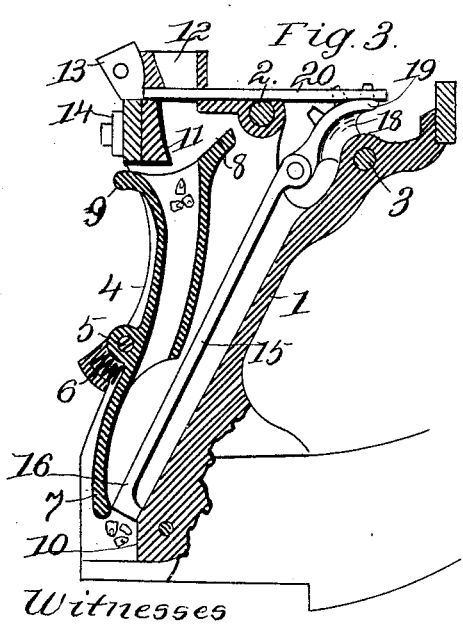
Figure 4:
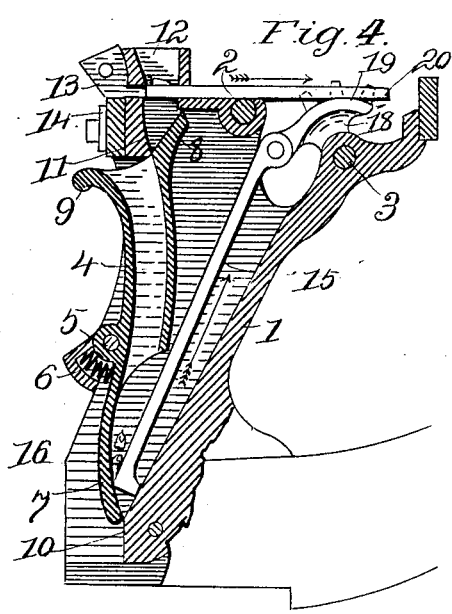
Figure 9:
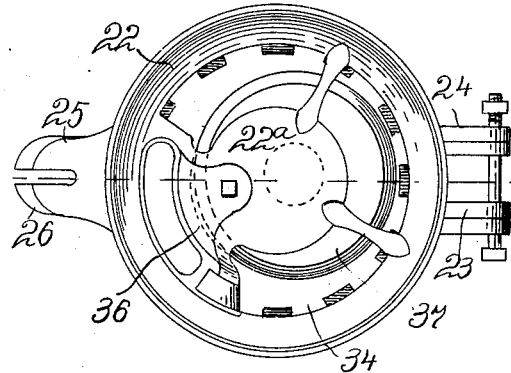
Figure 10:
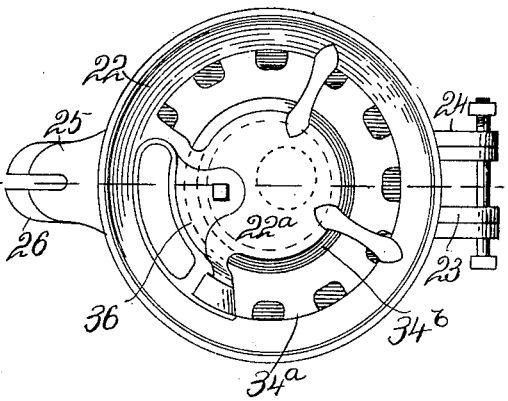
Figure 11:
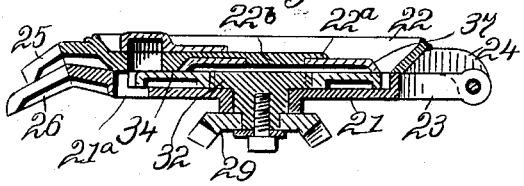
Figure 12:
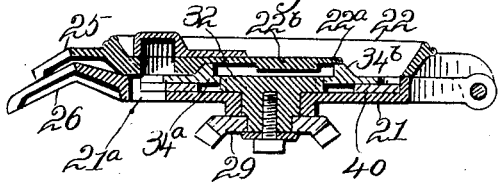
Figure 13:
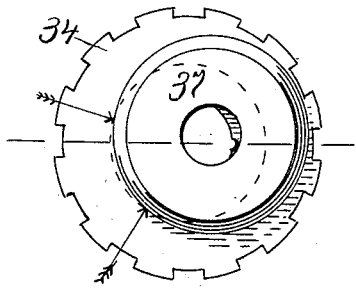
Figure 14:
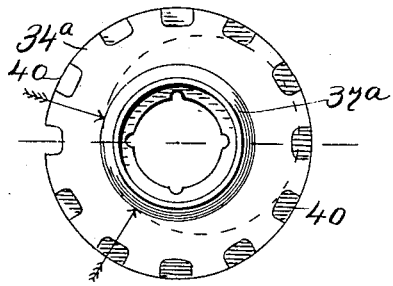
Figure 15:
Figure 16:
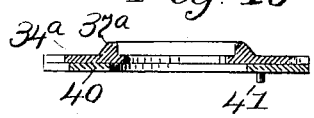

In the drawings forming part of this specification, Figures 1, 2, 3, 4, and 5 are each a vertical section through a planter-shank embodying my improved means for preventing hills from becoming mixed in transit from the seedbox to the furrow. In Figs. 2 and 5 my novel mode of getting access to the seed-plate is also represented in a general way. Fig. 4ª is a plan detail of the intercepting-valve used to positively prevent the grains of one hill from mixing with the grains of another hill. Fig. 6 is a plan showing the seed-plate holder in a normal position, right side up, and the box-bottom inverted. Fig. 7 is a plan of the seed-plate ring or holder with the seed-plate removed therefrom. Fig. 8 is a section through the seed-plate ring and adjuncts on line X in Fig. 7. Fig. 9 is a plan of the upper side of the dropping mechanism of a seedbox, showing provision made for dropping by edgewise selection. Fig. 10 is a plan of the upper side of the dropping mechanism of the seedbox, showing provision made for dropping by flatwise selection. Fig. 11 is a section on the broken line drawn through Fig. 9. Fig. 12 is a section on the broken line running through Fig. 10. Fig. 13 is a plan of the edge-drop seed-plate and the eccentric feed-plate used therewith for the purpose of tilting the grains into edgewise positions and feeding them into the cells. Fig. 14 is a plan of the seed-plate and ring, which are substituted for the edge-drop plate and eccentric feeder to convert the planter into a flatwise-selection dropper. Fig. 15 is a section on the broken line running through Fig. 13. Fig. 16 is a section on the broken line running through Fig. 14.

A planter-shank is shown at 1, a drill-shaft at 2, and a check-row shaft at 3. A tubular seed-chute 4 is pivoted at 5 in shank 1, and the spring 6 tends to hold the lower extension 7 of the chute against the front wall 10 of the shank, while the shelf extension 8 bears against a part 11 of the rear wall of the shank. The extension 7 is a continuation of the rear wall of chute 4, and the shelf 8 is formed of an upward extension of the front wall of the chute. The rear wall of the chute extends rearward, as shown at 9, for a purpose to be hereinafter illustrated. An arm 18 is fastened onto the rocking check-row shaft, and a plunger 15 is pivotally connected at its upper end with the swinging end of arm 18, while its lower end 16 extends downward into position to force the end 7 of the seed-chute out of contact with the shank and expel the corn when the check-row shaft is rocked backward.

The seed-chute 4 and the plunger 15 constitute in themselves a second drop movement, and they are claimed in application Serial No. 178,608, filed by me October 26, 1903, which resulted in Patent No. 757,399 on the 12th day of April, 1904. In this application the chute and plunger are typical of any drop movement that closes the shank at top and bottom or upper end and lower end, as the check-row shaft rocks forward and opens both closures as the check-row shaft is forced backward. The chute and plunger are particularly well adapted to coact with the intercepting-valve, which makes mixing of hills an impossibility; but they are not indispensable, as there are other second drop movements with which the intercepting-valve will coact more or less perfectly.

Above the upper closure of the second drop movement (in this case shelf 8) is placed the intercepting-valve, (in this case a straight flat bar 20,) and means is provided for forcing the intercepting-valve across the corn-passage 12 by backward rock of the check-row shaft. I prefer to build a segment of gear-wheel 19 onto the rock-arm 18 and to give the front end of the valve-plate a rack construction, as shown at 20ª in Fig. 4ʰ; but it is obvious that other mechanical expedients may be substituted for the specific means shown.

In planters of the cumulative drop type the number of grains required to constitute a hill are dropped one after another while the planter is traveling between cross-rows, and when a cross-row is reached there is or should be one hill accumulated on the upper closure and one on the lower closure of the shank. That is the condition shown in Fig. 1 of the drawings, one hill being detained by shelf 8 and the other being held by extension 7 of the chute. As the check-row shaft is rocked backward, the plunger approaches the extension 7 of the chute, while the intercepting-valve crosses the passage-way 12, and when the plunger reaches the extension the intercepting-valve is closed, while the other closures are not yet open. (See Fig. 2 of the drawings.) Further backward motion of the check-row shaft completes the operative thrust of the plunger, expelling the lower hill of corn and permitting the upper hill to fall off shelf 8, as shown in Fig. 3, while the rear end of the intercepting-valve moves farther across the seed-passage without producing any further result. The hill falling off shelf 8 cannot escape from the shank while the extension 7 is out of contact with the shank-wall 10, as the plunger closes the lower passage while expelling the seed therethrough, and by the time the rising plunger reaches the position shown in Fig. 4 the hill just off shelf 8 is held between the rear surface of the plunger and the front surface of extension 7, as shown, the extension is closed against wall 10, the shelf is closed against surface 11, and the intercepting-valve is just ready to begin its opening movement. As the plunger completes its rising movement, the hill in the lower end of the shank falls to its lowest position under the operative end of the plunger, the intercepting-valve is opened, and any grain or grains that the valve may have intercepted will fall upon shelf 8 to be joined later by others needed to complete a hill. The intercepting-valve eliminates all necessity for timing the second drop to catch falling grains and makes it possible to begin dropping from the seedbox before the check-row shaft has completed its backward rock and to close the final outlet anywhere between cross-rows without possibility of mixing the hills.

In Fig. 5 of the drawings the check-row planter is shown converted into a drill by swinging the upper end of the chute 4 forward and turning button 14 down behind extension 9 of the chute.

The seed-plate is journaled in a ring 21, which is hinged conjointly with the bottom casting 22 of the seedbox to a bracket 31 of the planter-frame. The seed-plate ring has lugs 23, which extend to the hinge-bracket 31, and on its opposite side it has a slotted plate 26, which normally rests upon a supporting-bracket 13 of the planter-shank. The box-bottom 22 has lugs 24, which extend to the hinge-bracket, and it also has a slotted plate 25, which normally rests upon plate 26 of the seed-plate ring. A bolt 27 hinges on a pin 28 in supporting-bracket 13, and it is used to hold the seed-plate ring and the box-bottom conjoined together and secured to the supporting-bracket. When it is desired to get to the seed-plate or seed-wheel for the purpose of making an interchange of plates, for instance, the nut on bolt 27 is unloosened, the bolt is swung clear of the plates 25 and 26, the seed-box and the seed-plate ring are swung to the position shown in Fig. 5, and the seed-plate ring is swung back to the horizontal, as shown by the dotted figure and the arrows in Fig. 5, leaving the seed-plate in the exposed condition shown in Fig. 6. The seed-plate is driven from the drill-shaft through gear-wheels 29 and 30. The wheel 29 is fastened onto a downward extension of hub 32 of the seed-wheel, commonly called "seed-plate," and the hub has radial extensions 33, which are adapted to engage corresponding recesses in the annular seed-wheel 34.

When the planter is used to plant by edgewise selection of grains, the seed-wheel 34 is provided with an eccentric feeder-plate 37, which operates as set forth in Patent No. 699,754, granted to me May 13, 1902, and a cover-plate 22ª of the seedbox-bottom has a downward-extending boss 22ᵇ, which acts as a journal for the eccentric feeder-plate. The feeder-plate is driven by a pin 35 on the seed-wheel contacting with rib 38 on the under side of the feeder, and the cut-off housing conforms nearly, but not quite, to the contour of the feeder-plate, as shown at 36 in Figs. 6, 9, and 10. The part of the cut-off housing that contacts with the feeder-plate describes a segment of a circle drawn from the center of the seed-wheel, the arrows in Figs. 13 and 14 being used to designate the ends of the housing and their relation to the perimeter of the feeder-plate. The circle of which the cut-off housing forms a segment is smaller than the circle of the feeder-plate, and so the feeder-plate contacts with the housing at the ends thereof, but not at intermediate points. In planting by flat-wise selection the uptilting action of the feeder-plates is needless, as the grains tend naturally to lie flat, and so the feeder is omitted to make space for the wider cells needed in flatwise dropping. The removal of the feeder-plate leaves a vacant space under cover-plate 22ª, and this is filled or walled rather by an annular ledge on the upper surface of the seed-plate having the flatwise cells. In Figs. 10, 12, and 14 the seed-plate having flatwise cells is shown at 34ª and the annular ledge thereon is shown at 37ª. The plate adapted to flat-wise dropping is much thinner than the edgewise plate, for the reason that the grains measure much less in flatwise altitude than in edgewise altitude, and to compensate for this thinness a ring 40 is placed under the seed-plate 34ª. The ring 40 has a pin 41, which engages a hole in the bottom of the seed-plate ring, (shown at 42 in Fig. 7.) It has a discharge-opening which coincides with the discharge-opening 21ª of the seed-plate ring when pin 40 is in hole 41, and its function is to form a raised bottom for the seed-plate ring.

To convert the planter from an edgewise dropper to a flatwise dropper, the elements shown in Figs. 14 and 16 are placed in the seed-plate ring in place of the elements shown in Figs. 13 and 15. The curvature of the annular ledge 37ª is concentric with the seed-wheel and in conformity with the inner surface of the edge-drop housing. The height of the ledge is the same as that of the eccentric feeder. The bevel of the ledge corresponds to the bevel of the feeder-wheel and the ledge is practically covered by the plate 22ª.

I claim—

1. In a corn-planter, the combination of a hollow shank, an upper closure and a lower closure for the shank, a rocking check-row shaft, a valve above the upper closure, means for closing the valve and opening the closures during the rock of the shaft in one direction, and means for shutting the closures and opening the valve during the rock of the shaft in the opposite direction.

2. In a corn-planter, the combination of a hollow shank, three valves in the shank at different altitudes, a reciprocating check-row mechanism, means for opening the lower valve and the intermediate valve and for closing the upper valve while the check-row mechanism moves in one direction, and means for closing the lower valve and the intermediate valve and for opening the upper valve while the check-row mechanism moves in the opposite direction.

3. In a corn-planter, the combination of a hollow shank, an upper valve, an intermediate valve and a lower valve for the shank, a rocking check-row shaft, an arm on the check-row shaft, means actuated by the arm for opening the lower valve and the intermediate valve as the check-row shaft is rocked backward, and means for closing the upper valve as the shaft is rocked backward.

4. In a corn-planter, the combination of a hollow shank, an upper valve, an intermediate valve and a lower valve for the shank, means for opening and closing the lower valve and the intermediate valve simultaneously, and means for closing the upper valve before the other valves are opened and for opening the upper valve after the other valves are closed.

5. In a corn-planter, the combination, of a hollow shank, an upper valve, an intermediate valve and a lower valve for the shank, a rocking check-row shaft, means for utilizing the earlier part of the backward rock of the shaft in closing the upper valve and means for utilizing the latter part of the backward rock of the check-row shaft in opening the lower valve and the intermediate valve.

6. In a corn-planter, the combination of a hinge-bracket secured to the planter-frame, a seed-wheel ring hinged to the bracket, a seed-box-bottom also hinged to the hinge-bracket, a supporting-bracket on the planter-frame on the side of the box opposite the hinge-bracket, a slotted plate on the seed-wheel ring adapted to rest upon the supporting-bracket, a plate on the box-bottom adapted to extend over the plate of the seed-wheel ring and having a slot adapted to coincide with the slot in the plate of the ring, and a bolt hinged to the supporting-bracket and adapted to enter the slots of the plates, substantially as and for the purpose described.

7. In a corn-planter, the combination of a hinge-bracket on the planter-frame, a seed-wheel ring hinged to the bracket, a seedbox-bottom also hinged to the hinge-bracket, a supporting-bracket on the planter-frame on the side of the box opposite the hinge-bracket, a plate on the seed-wheel ring adapted to rest on the supporting-bracket, a plate on the box-bottom adapted to rest on the plate of the seed-wheel ring and a bolt to bind the plates together and to the supporting-bracket.

8. In a corn-planter, the combination of a seedbox-bottom adapted to contain an edge-drop seed-wheel and an eccentric feeder-plate, a cut-off housing located to one side of the space for the eccentric feeder-plate, a cover-plate located above the space for the eccentric feeder-plate, and a seed-plate for flatwise dropping having a concentric ring on its upper surface adapted to bear against the cut-off housing and wall the space between the cover-plate and the seed-plate, substantially as and for the purpose described.

In testimony whereof I sign my name in the presence of two subscribing witnesses.

LEVI P. GRAHAM.

Witnesses:
E. S. McDONALD,
LOUIS B. CASSELL.